US007188094B2

(12) United States Patent
Excoffier et al.

(10) Patent No.: US 7,188,094 B2
(45) Date of Patent: Mar. 6, 2007

(54) INDEXING VIRTUAL ATTRIBUTES IN A DIRECTORY SERVER SYSTEM

(75) Inventors: Karine Excoffier, Montbonnot Saint Martin (FR); Robert Byrne, Voiron (FR); Gilles Bellaton, Saint Martin d'Heres (FR)

(73) Assignee: Sun Microsystems, Inc., Santa Clara, CA (US)

( * ) Notice: Subject to any disclaimer, the term of this patent is extended or adjusted under 35 U.S.C. 154(b) by 499 days.

(21) Appl. No.: 10/616,081

(22) Filed: Jul. 8, 2003

(65) Prior Publication Data

US 2004/0078368 A1 Apr. 22, 2004

(30) Foreign Application Priority Data

Jul. 8, 2002 (FR) .................................. 02 08558

(51) Int. Cl.
*G06F 17/30* (2006.01)

(52) U.S. Cl. .................... 707/1; 707/2; 707/6; 707/100

(58) Field of Classification Search .............. 707/1-10, 707/100, 101, 200
See application file for complete search history.

(56) References Cited

U.S. PATENT DOCUMENTS 6,347,312 B1 * 2/2002 Byrne et al. ................... 707/3
6,363,375 B1 * 3/2002 Hoshino et al. ........ 707/103 R
6,587,856 B1 * 7/2003 Srinivasan et al. ......... 707/102
6,768,988 B2 * 7/2004 Boreham et al. .............. 707/3
6,901,410 B2 * 5/2005 Marron et al. ........... 707/104.1
6,910,183 B2 * 6/2005 Maier et al. ................ 715/523
6,970,873 B2 * 11/2005 Fu et al. ..................... 707/100
6,983,269 B2 * 1/2006 Shi et al. ........................ 707/2
7,020,662 B2 * 3/2006 Boreham et al. ........ 707/104.1
7,092,958 B2 * 8/2006 Hempstead et al. ........ 707/102

* cited by examiner

*Primary Examiner*—Don Wong
*Assistant Examiner*—Marc R. Filipczyk
(74) *Attorney, Agent, or Firm*—Osha Liang LLP

(57) ABSTRACT

The invention proposes a directory server, capable of interacting with entries organized in a tree structure. Each entry has attributes, these attributes comprising real attributes each having a value stored in the entry. The directory server comprising: a mechanism capable of associating a virtual attribute to an entry, subject to a virtual attribute condition being verified, the virtual attribute condition being derived from data located elsewhere in the tree structure, and a resolving function, capable of receiving a first filter expression, based on a virtual attribute, for converting it into one or more second filter expressions, containing real attributes, and being computed from the first filter expression and from the virtual attribute condition.

30 Claims, 14 Drawing Sheets

ENTRY
404

| ATTRIBUTE TYPE 400 | ATTRIBUTE VALUE 402 |
|---|---|
| dn : | uid=Joe, ou=people, dc=france, dc=sun, dc=com |
| objectClass : | top |
| objectClass : | person |
| objectClass : | organizationlPerson |
| objectClass : | inetOrgPerson |
| cn : | Joe |
| sn : | Rayan |
| uid : | joerayan |
| mail : | joerayan@sun.com |
| phoneNumber : | 778 |

FIGURE 5
(PRIOR ART)

| ROLE TYPE | OBJECT CLASSES 81 | ATTRIBUTES 82 |
|---|---|---|
| MANAGED ROLE 801 | nsSimpleRoleDefinition<br>nsManagedRoleDefinition | description (optional) |
| FILTERED ROLE 802 | nsComplexRoleDefinition<br>nsFilteredRoleDefinition | nsRoleFilter<br>description (optional) |
| NESTED ROLE 803 | nsComplexRoleDefinition<br>nsNestedRoleDefinition | nsRoleDN<br>description (optional) |

FIGURE 8

INDEXING VIRTUAL ATTRIBUTES IN A DIRECTORY SERVER SYSTEM

RELATED APPLICATION

This Application claims priority to the French Patent Application, Number 0208558, filed on Jul. 8, 2002, in the name of Sun Microsystems, Inc., which application is hereby incorporated by reference.

BACKGROUND OF THE INVENTION

1. Field of the Invention

This invention relates to distributed computer systems.

2. Related Art

In certain fields of technology, complete computer systems, including a diversity of equipment, are optimized for storing and retrieving data. Such systems may provide services to user machines related to a local network, e.g., an Intranet, or to a global network, e.g., the Web network.

It is desirable that network users can access, upon a query, a large number of data, making it possible for the network users to create their own dynamic web site or to consult a dynamic web site, for example an e-commerce site on a multi platform computer system (e.g., Solaris, Windows NT). These queries are directed to a directory, e.g., a Lightweight Directory Access Protocol (LDAP) directory, and managed by a directory server. It is further desirable that this access to a large number of data be made possible more rapidly for each query arriving after a first query.

Queries can be more efficiently handled through the use of indexes that are maintained by the directory. However, some attributes cannot be indexed. In particular, virtual attributes do not support indexing. Virtual attributes are attributes that are not stored in the entry itself but are computed according to a condition derived from data stored elsewhere in the directory.

Virtual attributes are not indexed using existing indexing methods, because updating indexes based on such attributes can degrade performance. Indeed, a change made on the definition of a virtual attribute requires the regeneration of the entire virtual attribute index, which is costly.

More generally, an LDAP directory server does not support LDAP queries that contain a filter that references virtual attributes. A search filter based on a virtual attribute may return erroneous results when executed. Only attributes stored in entries (or real attributes) are efficiently supported in LDAP search filters. To search entries based on the values of a virtual attribute, a directory client must retrieve a set of the entries, such as an entire branch, and sort through them to select the entries of interest.

A general aim of the present invention is to provide advances in these directions.

SUMMARY OF THE INVENTION

Broadly, a directory server capable of interacting with entries organized in a tree structure is described. Each entry has attributes, these attributes comprising real attributes each having a value stored in the entry. The directory server comprises a mechanism capable of associating a virtual attribute to an entry, subject to a virtual attribute condition being verified, the virtual attribute condition being derived from data located elsewhere in the tree structure; and a resolving function, capable of receiving a first filter expression, based on a virtual attribute, for converting it into one or more second filter expressions, containing real attributes, and being computed from the first filter expression and from the virtual attribute condition.

There is also described a method of operating a directory server system, comprising a directory server interacting with entries organized in a tree structure, each entry having attributes. The attributes comprise real attributes, each real attribute having a value stored in the entry, and virtual attributes, each virtual attribute being associated to an entry, subject to a virtual attribute condition being verified. The virtual attribute condition is derived from data located elsewhere in the tree structure. The method comprises: receiving a first filter expression; and if the first filter expression is based on a virtual attribute, converting said first filter expression into one or more second filter expressions, containing real attributes, the second filter expression(s) being computed from the first filter expression and from the virtual attribute condition.

Embodiments of the present invention can also be defined as an apparatus or system, and/or as software code for implementing the method, or for use in the system, in the alternative embodiments to be described hereinafter.

These and other objects as well as advantages of the present invention will no doubt become obvious to those of ordinary skill in the art after having read the following detailed description of the preferred embodiments, which are illustrated in the various drawing figures.

BRIEF DESCRIPTION OF THE DRAWINGS

The accompanying drawings, which are incorporated in and form a part of this specification, illustrate embodiments of the invention and, together with the description, serve to explain the principles of the invention.

FIG. 5 illustrates attribute types and values of a directory entry according to an embodiment of the present invention.

FIG. 8 represents the structure of three types of roles according to embodiments of the present invention.

DETAILED DESCRIPTION OF THE INVENTION

Reference will now be made in detail to the various embodiments of the invention, examples of which are illustrated in the accompanying drawings. Now, making reference to software entities imposes certain conventions in notation. Particularly, an expression indicated between quote signs (" ") may be used to design LDAP Data Interchange Format (LDIF) extracts and an expression in italics may be used for representing an attribute, an object class or an LDAP operation.

As they may be cited in this specification, Sun, Sun Microsystems and Sun One are trademarks of Sun Microsystems, Inc.

A portion of the disclosure of this patent document contains material which may be subject to copyright protection. The copyright owner has no objection to the facsimile reproduction by anyone of the patent document or the patent disclosure, as it appears in the Patent and Trademark Office patent file or records, but otherwise reserves all copyright and/or author's rights whatsoever.

Figure 1:
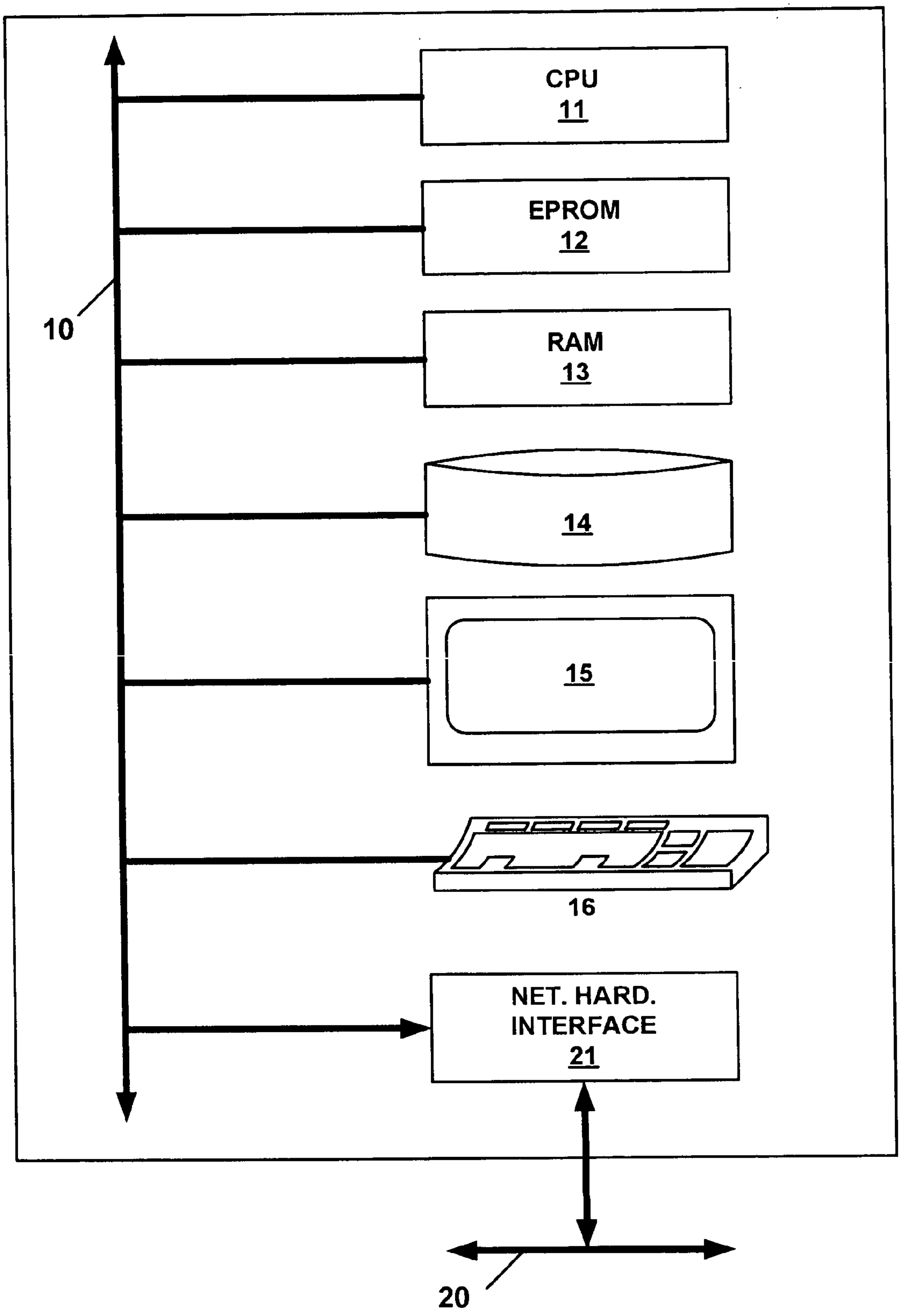
FIG. 1 is a general diagram of a computer system in which the embodiments of the present invention are applicable.

Embodiments of the present invention can be implemented in a computer system, or in a network comprising computer systems. FIG. 1 represents an example of the hardware of such computer systems. The hardware comprises: a processor (CPU) 11 (e.g., an Ultra-Sparc); a program memory 12 (e.g., an EPROM, a RAM, or Flash memory); a working memory 13 (e.g., a RAM of any suitable technology); a mass memory 14 (e.g., one or more hard disks); a display 15 (e.g., a monitor); a user input device 15 (e.g., a keyboard and/or a mouse); and a network interface device 21 connected to a communication medium 20, which is in communication with other computers. Network interface device 21 may be of the type of Ethernet, or of the type of Asynchronous Transfer Mode (ATM), or of some other type. Medium 20 may be based on wire cables, fiber optics, or radio communications, for example.

Data can be exchanged between the components of FIG. 1 through a bus system 10, represented as a single bus for simplification of the drawing. Bus systems may include a processor bus, e.g., PCI, connected via appropriate bridges to, e.g., an ISA or a SCSI bus.

The data exchanged are handled by a resource provider using a server to deliver data to user computers, or to store the data provided by the user computers. Browsers, e.g., Internet Explorer, are further provided on user computers, to enable users to make requests, to retrieve or store data. The resource provider makes it possible for user computers on a network to share data of any kind.

iPlanet E-commerce Solutions, now Sun One E-commerce Solutions, has developed a "net-enabling" platform called the Internet Service Deployment Platform (ISDP). ISDP includes multiple, integrated layers of software that provide a full set of services supporting application development, e.g., business-to-business exchanges, communications and entertainment vehicles, and retail Web sites.

Sun One™ Directory Server provides a centralized directory service directory service for an intranet or an extranet. A directory service represents a collection of software, hardware, and processes that are able to deliver and store information. The directory service generally includes one or more directory client programs that can access the data stored in the directory, e.g., names, phone numbers or addresses.

The Sun One™ Directory Server is a general purpose directory that stores information in a single, network-accessible repository. The Sun One™ Directory Server provides the standard protocol LDAP and an application programming interface (API) to access the information contained by the Sun One™ Directory Server.

LDAP is the Internet standard for directory lookups, just as the Simple Mail Transfer Protocol (SMTP) is the Internet Standard for delivering electronic mail (e-mail) and the Hypertext Transfer Protocol (HTTP) is the Internet standard for delivering documents. Technically, LDAP is defined as on-the-wire bit protocol (similar to HTTP) that runs over Transmission Control Protocol/Internet Protocol (TCP/IP). It specifies the interaction between clients and servers and determines how LDAP queries and responses are carried over the IP network.

AN LDAP-compliant directory, such as the Sun One™ Directory Server, leverages a single, master directory that contains users, groups and access information. The directory is hierarchical, not relational and is particularly fitted for reading while offering a high reliability and a high scalability.

Figure 2:
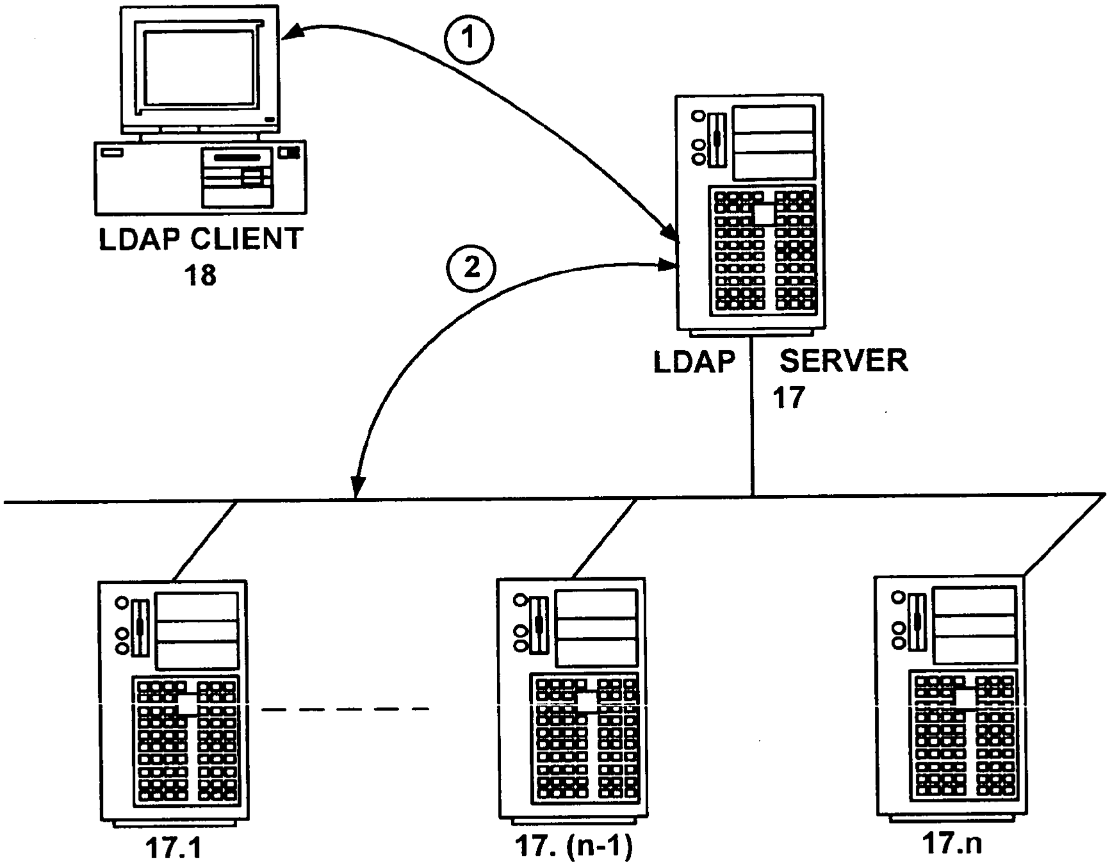
FIG. 2 illustrates a typical LDAP exchange between an LDAP client and an LDAP server, and between the LDAP server and further servers, according to an embodiment of the present invention.

Referring now to FIG. 2, LDAP defines a communication 1 between a server 17 and a client 18. LDAP also defines a communication 2 between LDAP server 17 and servers 17.1 to 17.n, which makes it possible for the server LDAP 17 to exchange its content (replication service) with servers 17.1 to 17.n or to access the directory of one of the servers 17.1 to 17.n (referral service) and vice versa.

The LDAP protocol is a message-oriented protocol. The client 18 constructs an LDAP message containing a request and sends the message to the server 17. The server 17 processes the request and sends a result, or results, back to the client 18 as a series of LDAP messages.

Such a client-server communication additionally lies on a specific architecture. LDAP creates a standard defining the way data are exchanged between the client computer and the directory server and defining the way data are modeled. More specifically, LDAP relies on four basic models:

an information model;

a naming model;

a functional model; and a security model.

The LDAP information model defines the kind of data that can be stored in a directory. LDAP directory is populated with entries. An entry corresponds to real-world objects, such as a person, a printer, or configuration parameters.

Figure 3:
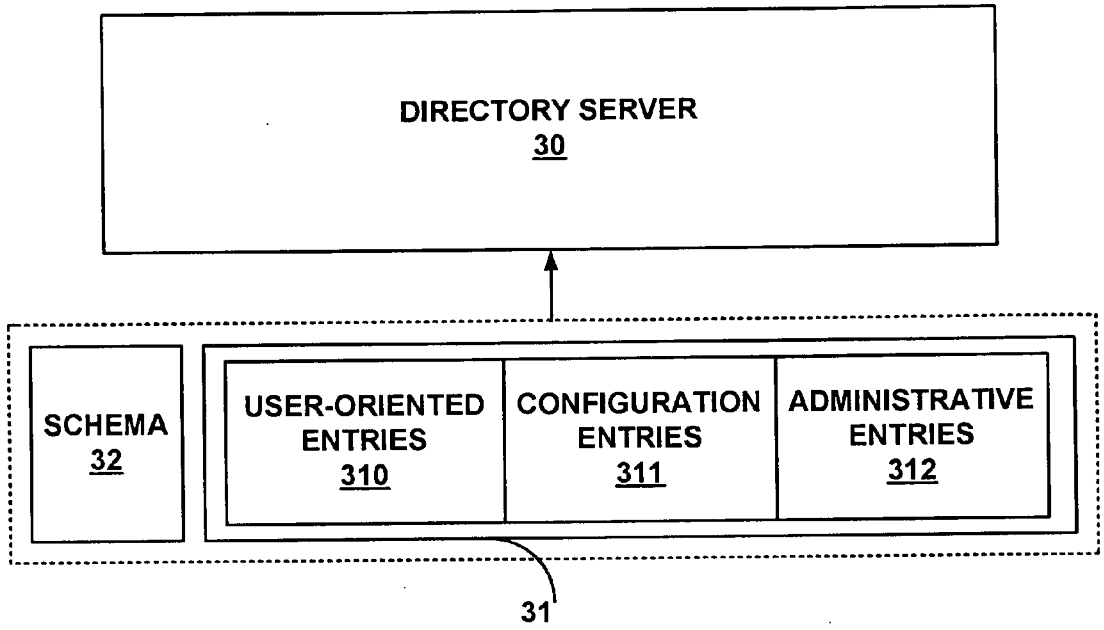
FIG. 3 illustrates the general structure of an LDAP directory according to an embodiment of the present invention.

FIG. 3 illustrates an example of a general structure of an LDAP directory. The directory server 30 executes implemented functions based on the entries 31 stored in databases. The entries comprise configuration entries 310, user entries 311 and administrative entries 312. These entries further interact with the schema 32 described below.

The configuration entries are stored under the subtree "cn=config." The user entries comprise data related to the users of the directory server. Administrative entries relate to user management and are generally implemented as LDAP subentries.

An entry contains a set of attributes associated with values. Each entry is uniquely identified by its distinguished name (DN). The distinguished name may be stored in the attribute dn (distinguishedName).

Figure 4:
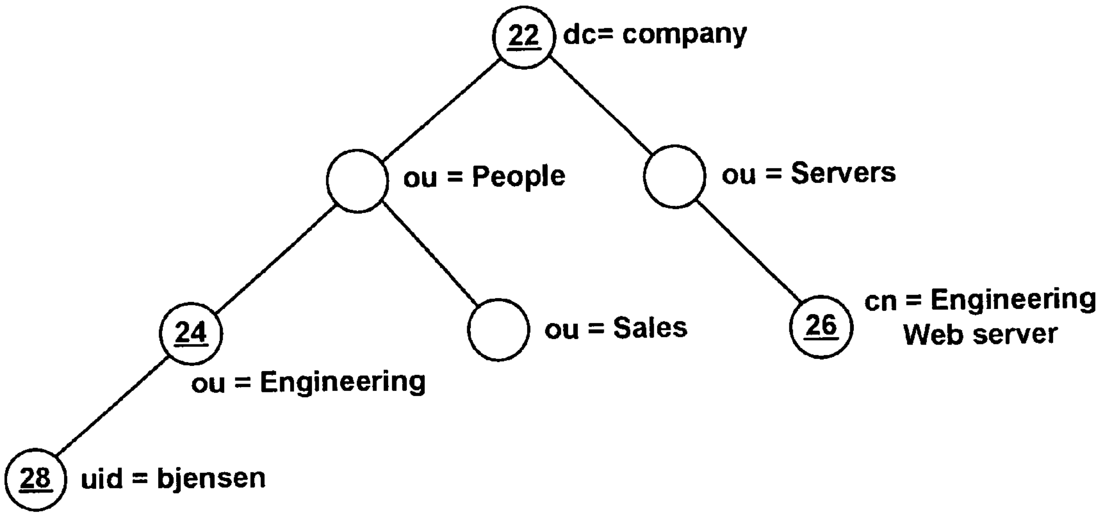
FIG. 4 shows a portion of an LDAP tree according to an embodiment of the present invention.

LDAP entries are organized in a hierarchical tree structure, called the Directory Information Tree (DIT). Each node of the tree comprises an entry. FIG. 4 illustrates an organization entry 22 with the attribute type of domain component dc, an organizational unit entry 24 with the attribute type of organizational unit ou, a server application entry 26 with the attribute type of common name cn, and a person entry 28 with the attribute type of user ID uid. The entries are connected by the directory. Each server has a particular entry called root directory specific entry (rootDSE) that contains a description of the tree and of its content.

FIG. 5 is an LDAP Data Interchange Format (LDIF) representation of an entry 404, showing the attribute types 400 and their values 402. An LDIF is an ASCII text file format used to describe directory entries and operations on those entries. It enables to create, modify, and delete directory entries and to import and export data among LDAP directories.

The information model is extensible, which means that new types of information can be added to an LDAP directory.

Descriptive information is stored in the attributes of the entry. Each attribute describes a specific type of information. Attributes may have constraints that limit the type and length of data placed in attribute values.

Entries include an objectclass attribute that lists the object classes to which an entry belongs. An entry can belong to one or more object classes and must satisfy all of them. The objectclass attribute defines which attributes are required and which attributes are allowed in the entry.

For example, in FIG. 5, the entry 404 represented in LDIF belongs to the object classes top, person, organizationalPerson and inetOrgPerson.

Each attribute has a corresponding syntax definition. The syntax definition describes the type of information provided by the attribute. The object classes, the required and allowed attributes, and the syntax definition of the attributes are listed in the directory schema.

The LDAP directory comprises a structure 32, represented in FIG. 3, that defines object classes and attributes, and may be viewed as metadata. This structure, called the schema, sets the rules defining what information can be stored in the LDAP directory and how information is organized. The schema specifies the required and allowed attributes that are used to store information and theirs syntax definition. A schema checking function may be activated, thus causing the directory server to check new entries to verify:

- object classes and attributes attached to new entries are defined in the schema 32;
- the attributes required for an object class according to the schema 32 are contained in an entry attached to that object class; and
- only attributes allowed by the object class according to the schema 32 are contained in an entry attached to that object class.

The LDAP naming model specifies that directory entries must be hierarchical and organized in an inverted tree structure. As mentioned above, each entry has a unique name called a distinguished name dn. The dn consists of the name of a list of the names of the parent entries in the directory back to the top of the directory hierarchy, the name of the entry being at the extreme left, e.g., "uid=Joe, ou=people, dc=france, dc=sun, dc=com," in FIG. 5. The root of the entry is at the extreme right of the dn. The name at the extreme left of the dn, "uid=Joe" in the example, is the relative distinguished name or rdn. Within a set of entries sharing the same parents, the rdn must be unique. This ensures that two entries in the directory tree, cannot have the same dn.

The LDAP functional model comprises eight basic functional operations that a user from a client computer can perform on the directory data of an LDAP directory server:

- bind and unbind: begin and end the exchange of information between LDAP clients and the directory server;
- add, delete, and modify: apply on specific entries in the DIT;
- compare: applies on two entries to compare their content according to criteria;
- search: locates specific entries in the DIT; and
- modifyRDN: applies to change the distinguished name dn of an entry.

In addition to the eight basic functional operations, the LDAP protocol defines a framework for adding new operations to the protocol via LDAP extended operations. Extended operations allow the protocol to be extended in an orderly manner to meet new marketplace needs as they emerge.

The search operation supported by LDAP allows clients to search the directory for data. Search operations are performed by search filters.

A search filter selects entries in the DIT, based on criteria defined in a filter expression. They are mostly used with the Idapsearch function. Exhibit E1.1 shows an example of parameters used in an Idapsearch function.

E1.1—Exemplary Parameters of Idapsearch Function

Idapsearch [options] [search filter] [list of attributes]

Referring to Exhibit E1.1, an Idapsearch function has the following parameters:

- options: represents a series of command-line options. They are specified before the search filter;
- search filter: represents an LDAP filter expression; and
- list of attributes: represents a list of attributes separated by a space. This list of attributes is returned after the search filter. If the list of attributes is not specified, the search provides values for attributes permitted by the access control set in the directory.

Exhibit E1.2 represents examples of options used for performing an LDAP search according to one embodiment of the present invention.

E1.2—Exemplary Options for an LDAP Search

| Option | Description |
|---|---|
| −b | Specifies the starting point for the search in the DIT. The value specified is a distinguished name that currently exists in the database.<br>For example: −b "cn=bob, dc=siroe, ou=people, dc=siroe, dc=com" |
| −D | Specifies the distinguished name used to authenticate to the server. The value specified must be a DN recognized by the Directory Server and must be allowed to search for the entries.<br>For example: "−D uid=bjensen, dc=siroe, dc=com" |
| −h | Specifies the machine hostname or machine IP address of the Directory Server.<br>For example: "−h mozilla" |
| −l | Specifies the maximum time (expressed in seconds) to take for a search request.<br>For example: "−1 500 " |
| −p | Specifies the TCP port number used by the Directory Server.<br>For example: "−p 1049" |
| −s | Specifies the search scope. The scope may be:<br>- the entry specified in "−b option" (base-Search);<br>- the immediate children of the entry specified in the "−b option" (one-Search). The entry specified in the −b option is not searched.<br>- the entry specified in the "−b option" and all of its descendants (subSearch). |

-continued

| Option | Description |
|---|---|
| –w | Specifies the password associated with the distinguished name that is specified in the –D option. For example: "–w secret" |
| –x | Specifies that the search results are transmitted to the server rather than on the client. In general, it is faster to transmit results to the server. |
| –z | Specifies the maximum number of entries to return in response to a search request. For example: "–z 500" |

A filter expression is the expression of a condition on given attributes. The basic syntax of a filter expression comprises:

an attribute;

an operator; and a value.

For example, in the search filter "PostalCode=75006," "PostalCode "is the attribute, "=" is the operator, and "75006" is the value.

A search filter can further comprise several attributes combined by boolean operators.

The type of an LDAP search filter depends on the operator used. For example, a search filter using the operator "=" is an equality filter. An equality filter, e.g., "sn=Jensen", returns entries that comprise attribute values exactly matching the value specified in the filter.

Exhibit E1.3 contains examples of definitions of main search filter types. Additionally, a search filter can be combined using boolean operators to form complex expressions.

E1.3—Exemplary Search Filter Types

| Search Type | Operator | Description |
|---|---|---|
| Equality | = | Returns entries that contain attribute values exactly matching the value specified by the filter. For example: "sn=jensen" |
| Substring | = string* string | Returns entries that contain attributes comprising the substring specified by the filter. For example: "cn=joe*", "cn=*Jensen", "cn=*Joe*", "cn=B*Joe" *indicates zero or more characters |
| Greater than or equal to | >= | Returns entries that contain attributes that are greater than or equal to the value specified by the filter. For example: " age >= 40" |
| Less than or or equal to | <= | Returns entries that contain attributes that are less than or equal to the value specified by the filter. For example: "age <= 40" |
| Presence | =* | Returns entries that contain one or more values for the attribute specified by the filter. For example: "cn=*", "telephonenumber=*" |
| Approximate | ~= | Returns entries that contain the specified attribute with a value that is approximately equal to the value specified in the search filter. For example: "sn~=janson" could return "sn=jensen" |

An example of complex filter expression is shown in Exhibit E1.4.

E1.4—Example of Complex Search Filter

"(!cn=Bob Jones*)((cn=Bob*)|(cn=*Jones))(age<=40)"

Exhibit E1.5 contains definitions of certain boolean operators.

E1.5—Exemplary Boolean Operator Definitions

| Operator | Symbol | Description |
|---|---|---|
| AND | & | All specified filters must be true for the statement to be true. For example, (&(filter)(filter)(filter). . .) |
| OR | \| | At least one specified filter must be true for the statement to be true. For example, (\|(filter)(filter)(filter). . .) |
| NOT | ! | The specified statement must not be true for the statement to be true. Only one filter is affected by the NOT operator. For example, (!(filter)) |

In a search filter comprising boolean expressions, the expressions between parentheses are evaluated from left to right, and for each expression, the sub parenthetical expressions are evaluated from the innermost to the outermost. Thus, in the example shown in Exhibit E.1.4, expressions are evaluated in the order:

1—(!cn=Bob Jones*),

2—(|(cn=Bob*)(cn=*Jones)),

3—(age<=40);

and in (|(cn=Bob*)(cn=*Jones)), expressions are evaluated in the order:

2.1—(cn=Bob*), 2.2—(cn=*Jones), 2.3—(|(cn=Bob*)(cn=*Jones)).

When an LDAP search is received by the server comprising a search filter, the search filter is evaluated and divided into elementary search filters as mentioned above.

The performance of an LDAP search may be improved by the use of indexes. Indexes are files stored in the directory databases, which may be cached. Such index files contain indexing tables. Indexing tables maintain a list of the entries matching a given value of an attribute or indexed attribute, according to a given search type. In the indexes, the candidate entries are identified by an identifier such as an identifier (ID) number.

More specifically, indexes resolve the problem of restricted search scope. Indeed, a search can be made more efficient if the user can restrict the scope of the search, which requires some knowledge of the directory structure. With no structure knowledge, the search is performed all over the tree structure. Indexes provide a preselection of entries, obtained during a previous search of a given type. Instead of repeating the same search every time it is requested, the directory server stores the result obtained in the previous search in indexes and updates these indexes when an attribute or an attribute value is modified.

The names of the index files are based on the indexed attribute, e.g., sn.db. Each index file may contain different types of indexes. A directory server supports the following types of indexes, in accordance with the existing search filter types:

the presence index lists the entries that contain a particular attribute, such as cn;

- the equality index list the entries that contain a specific attribute value, such as "cn=bob;"
- the approximate index allows approximate searches, such as "cn~=bob;"
- the substring index allows searches against substrings within entries, such as "cn=*peters;"
- the browsing index, or virtual list view index, speeds up the display of entries in the directory server console. This index is particularly useful for the branches of the directory that contain hundreds of entries, for example, the ou=people branch; and
- the international index speeds searches for information in international directories.

Attributes that are not indexed can be specified in filter expressions, although the search performance may be degraded according to the type of search. For such attributes, the directory server only examines a subset of the entries of the directory information tree (DIT). However, maintaining indexes for attributes that are not used in a search may also degrade the search performance.

Figure 6:
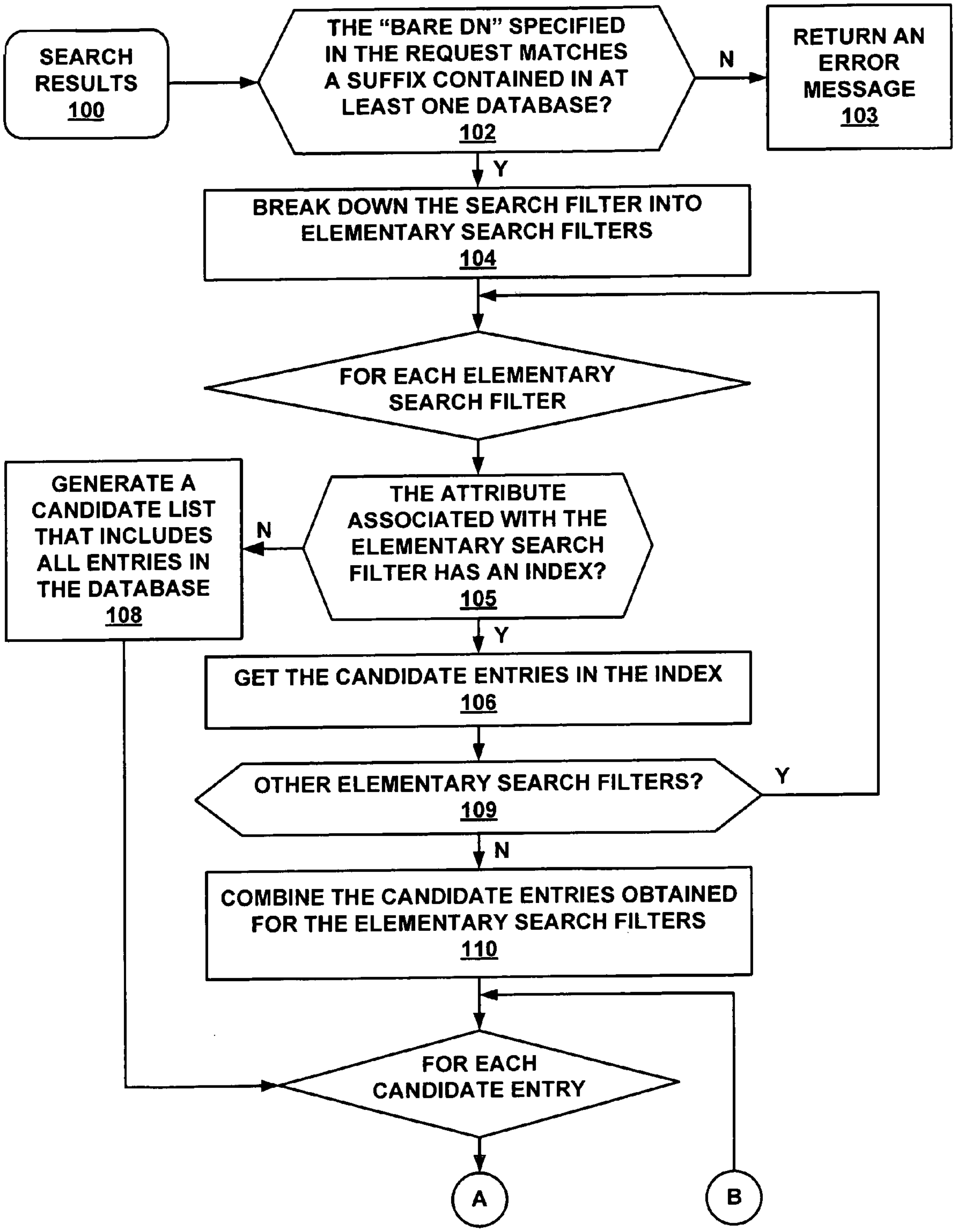
FIG. 6 is a flowchart representing the operations performed for evaluating a search request according to embodiments of the present invention.
Figure 6:
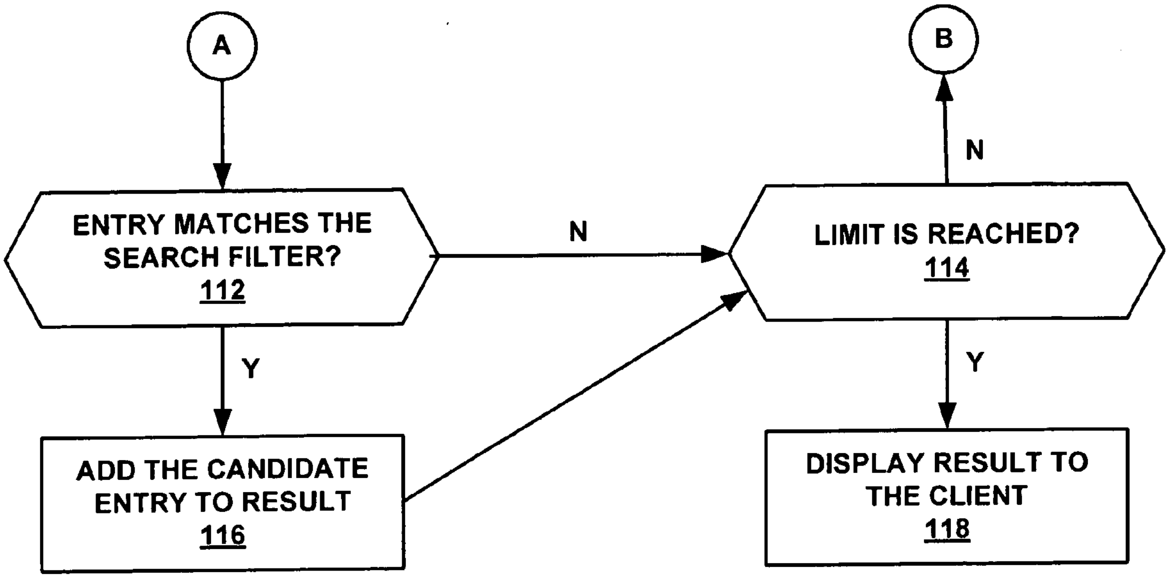

As mentioned, indexes can be used to speed up searches. FIG. 6 is a flowchart representing the operations performed for evaluating a search request using indexes.

At operation 100, the directory server receives a search request from a client.

Operation 102 checks whether the base DN specified in the request matches a suffix contained by at least one of its database. If so, the directory processes the request. Otherwise, the directory server returns an error message (operation 103) to the client indicating that the suffix does not match.

Operation 104 breaks down this search filter contained by the request into elementary search filters of the type "attribute operator value." The directory then processes each elementary search filter as follows.

Operation 105 determines whether the attribute mentioned in the elementary search filter is associated with an index, and if so the server reads that index (operation 106) to generate a list of candidate entries potentially matching the request. More exactly, the directory server takes the list of candidate entries from the index as a series of entry ID numbers, and reads the corresponding entries from a file that contains the actual directory database entries.

If the attribute mentioned in the elementary search filter is not associated with an index (operation 105), operation 108 generates a candidate list that includes all entries in the database.

The directory server repeats operations 105 and 106 for each elementary search filter and when the elementary search filters are processed (test 109), operation 110 combines the candidate entries obtained for the elementary search filters.

If a search request mentions several attributes (operation 109), the directory server checks several indexes and then combines the resulting lists of candidate entries at operation 110.

For each one of the entries of the candidate list provided by operation 110 or 108, the directory server determines whether the entry matches the search criteria (operation 112). If so, at operation 116, the directory server adds the entry to the result.

The directory server stops and transmits the result to the client, at operation 118, when a predefined limit is reached (operation 114). The predefined limit may be reached when the candidate entries have been examined. Alternatively, the limit may be set by one of the following attributes:

- nsslapd-sizelimit, which sets the maximum number of entries to return from a search operation;
- nsslapd-timelimit, which sets the maximum number of seconds to spend on a search request; or
- nsslapd-lookthroughlimit, which sets the maximum number of candidate entries to examine during a search request.

Virtual attributes are attributes that are not stored in the entry itself but are computed according to a condition derived from data stored elsewhere in the directory. The most commonly used are the nsrole attribute and CoS attribute. In particular, the virtual attribute nsrole is computed to indicate the roles possessed by a user entry, and a CoS attribute is generated by class of service (CoS) in target entries to allow these entries to share a same value of the CoS attribute without having to store it in each entry.

The foregoing description refers to the nsrole virtual attribute, as an exemplary application of this invention; however, the features of the present invention can be extended to other virtual attributes.

The nsrole attribute is a multi-valued attribute that indicates the roles possessed by a user entry. Roles constitute an LDAP grouping mechanism. A role may have members, which are the entries said to possess the role. Role mechanism enables the following operations:

- enumerating the members of a given role;
- determining whether a given entry possesses a particular role; and
- enumerating the roles possessed by a given entry, It is further possible to assign a particular role to a given entry and to revoke a particular role from a given entry.

Figure 7:
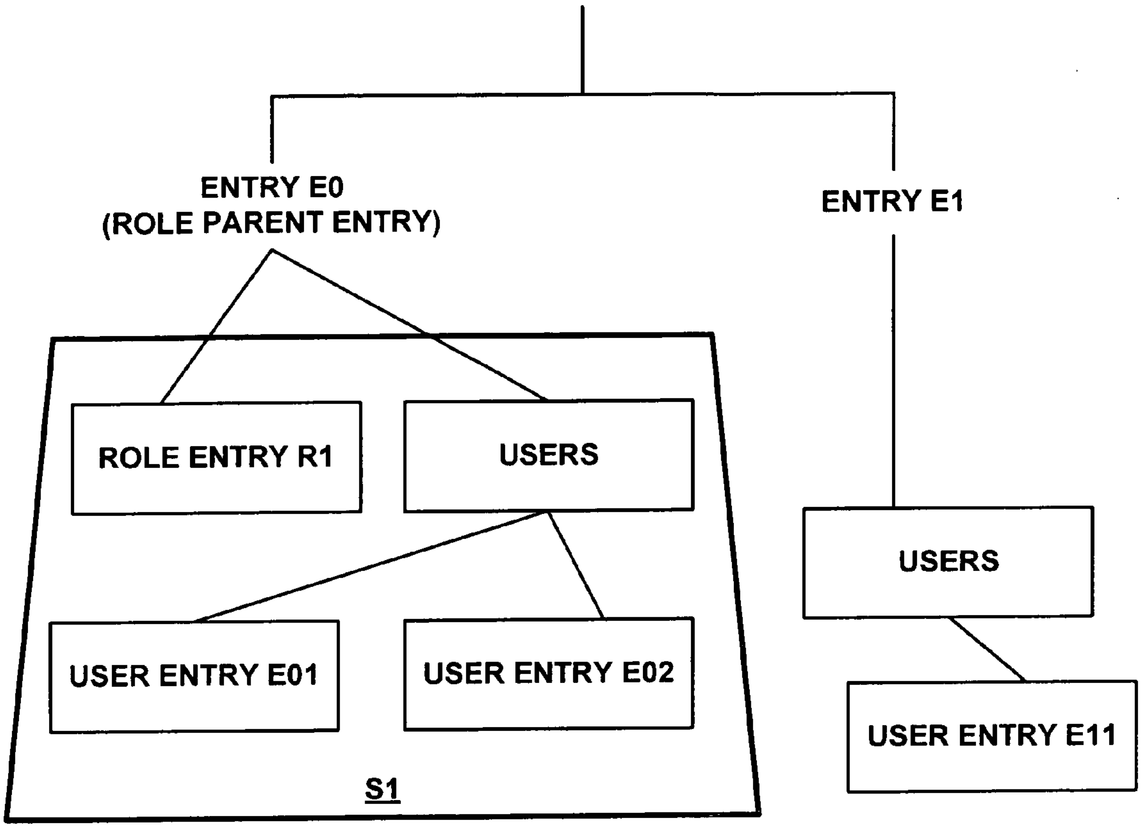
FIG. 7 illustrates the scope of a role according to an embodiment of the present invention.

Every role is defined by its own definition entry. A role is uniquely identified by the distinguished name of its definition entry. Role definition entries are LDAP subentries and therefore inherit the subentry mechanism, defined in the ISO/IEC X.509 standard, for scoping. The scope of a role corresponds to the subtree of the role parent entry as illustrated by FIG. 7. User entries E01 and E02 are in the scope S1 of the role R1 while entry E11 is out of the scope of the role R1. Thus, E01 and E02 are likely to be members of role R1 while E11 cannot be a member of role R1.

Referring to FIG. 8, a role can be of "managed" type 801, "filtered" type 802, or "nested" type 803. Each type of role further has two specific object classes 81 that inherit from the nsRoleDefinition object class and is related to specific attributes 82 (nsRoleDN, nsRoleFilter).

On creating a role, members may be assigned to the role as follows:

- members of a managed role have the nsRoleDN attribute (or role identifier) in their entry;
- members of a filtered role are entries that match the filter specified in the nsRoleFilter attribute (or role filter condition) of the role definition entry; and
- members of a nested role are members of the roles specified in the nsRoleDN attributes of the nested role definition entry.

Exhibits E2.1, E2.3 and E2.5 contain an example of a managed role, an example of a filtered role and an example of a nested role, respectively, in LDIF. Exhibits E2.2 and E2.4 represent respectively a user entry, possessing the managed role of exhibit E2.1, and a user entry, member of the filtered role of exhibit E2.3.

E2.1—Example of Managed Role dn: cn=Marketing, ou=people, dc=example, dc=com
objectclass: top
objectclass: LDAPsubentry
objectclass: nsRoleDefinition
objectclass: nsSimpleRoleDefinition
objectclass: nsComplexRoleDefinition
cn: Marketing
description: managed role for marketing staff E2.2—Example of Entry Member of Marketing Role dn: cn=Joe, ou=people, de=example, de=com
objectclass: person
cn: Joe
sn: Bradford
userpassword: joepasswd
nsRoleDN: cn=Marketing, ou=people, dc=example, dc=com E2.3—Example of Filtered Role dn: cn=SalesFilter, ou=people, dc=example, dc=com
objectclass: top
objectclass: LDAPsubentry
objectclass: nsRoleDefinition
objectclass: nsComplexRoleDefinition
objectclass: nsFilteredRoleDefinition
cn: SalesFilter
nsRoleFilter: o=sales
description: filtered role for sales staff E2.4—Example of Entry Member of Filtered Role dn: cn=Richard, ou=people, dc=example, dc=com
objectclass: person
cn: Richard
sn: Parker
userpassword: richardpasswd
o: sales E2.5—Example of Nested Role dn: cn=MarketingSales, ou=people, dc=example, dc=com
objectclass: top
objectclass: LDAPsubentry
objectclass: nsRoleDefinition
objectclass: nsComplexRoleDefinition
objectclass: nsNestedRoleDefinition
cn: MarketingSales
nsRoleDN: cn=Marketing, ou=people, dc=example, dc=com
nsRoleDN: cn=SalesFilter, ou=people, de=example, de=com
description: nested role for marketing and sales staff When a request is made to compute nsrole for a given user entry, the directory server tests if the given entry is member of a set of candidate roles. The set of candidate roles may be a list of roles associated with the top suffix of the given entry. This list is prepared in advance in a role cache. The role cache is a data structure updated on creating a new role or on deleting an existing role in the subtree of the top suffix. The role cache contains the list of the roles defined in the subtree of the top suffix. Each role of the role cache is also related to role data, which comprise specific information about the role.

The nsrole attribute is computed for an entry depending on a condition (or virtual attribute condition) that comprises a role membership condition, related to nsRoleDN attribute and nsroleFilter attribute, and a scope condition.

Figure 9A:
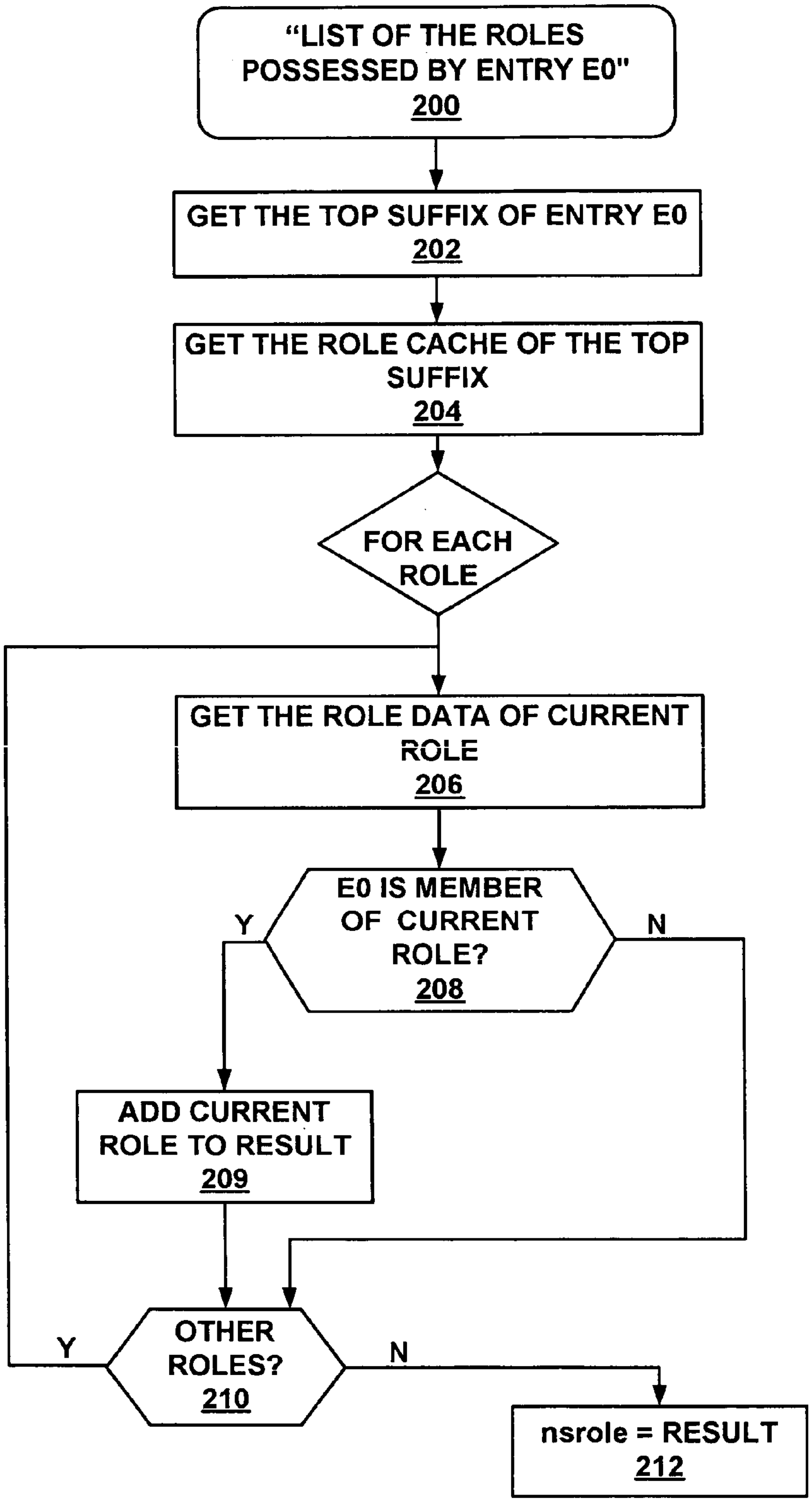
FIG. 9*a* is a flowchart for enumerating the roles possessed by a given entry according to embodiments of the present invention.

FIG. 9*a* is a flowchart representing the operations performed by the directory server for computing an nsrole attribute in order to determine the roles possessed by a given user entry.

At operation 200, the directory server receives the request for determining the roles possessed by a given user entry E0.

Computing the nsrole attribute starts with operation 202. This operation performs access to the top suffix of entry E0.

Operation 204 retrieves a role cache associated with the top suffix of E.

Operation 206 retrieves the role data of the current role for each role of the cache role.

For each role of the cache role, operation 208 tests if entry E0 possesses the current role, and if so adds the role to the result and select the next role of the list.

When the candidate roles have been tested (operation 210 fails), the directory server assigns the result to nsrole, at operation 212.

Figure 9B:
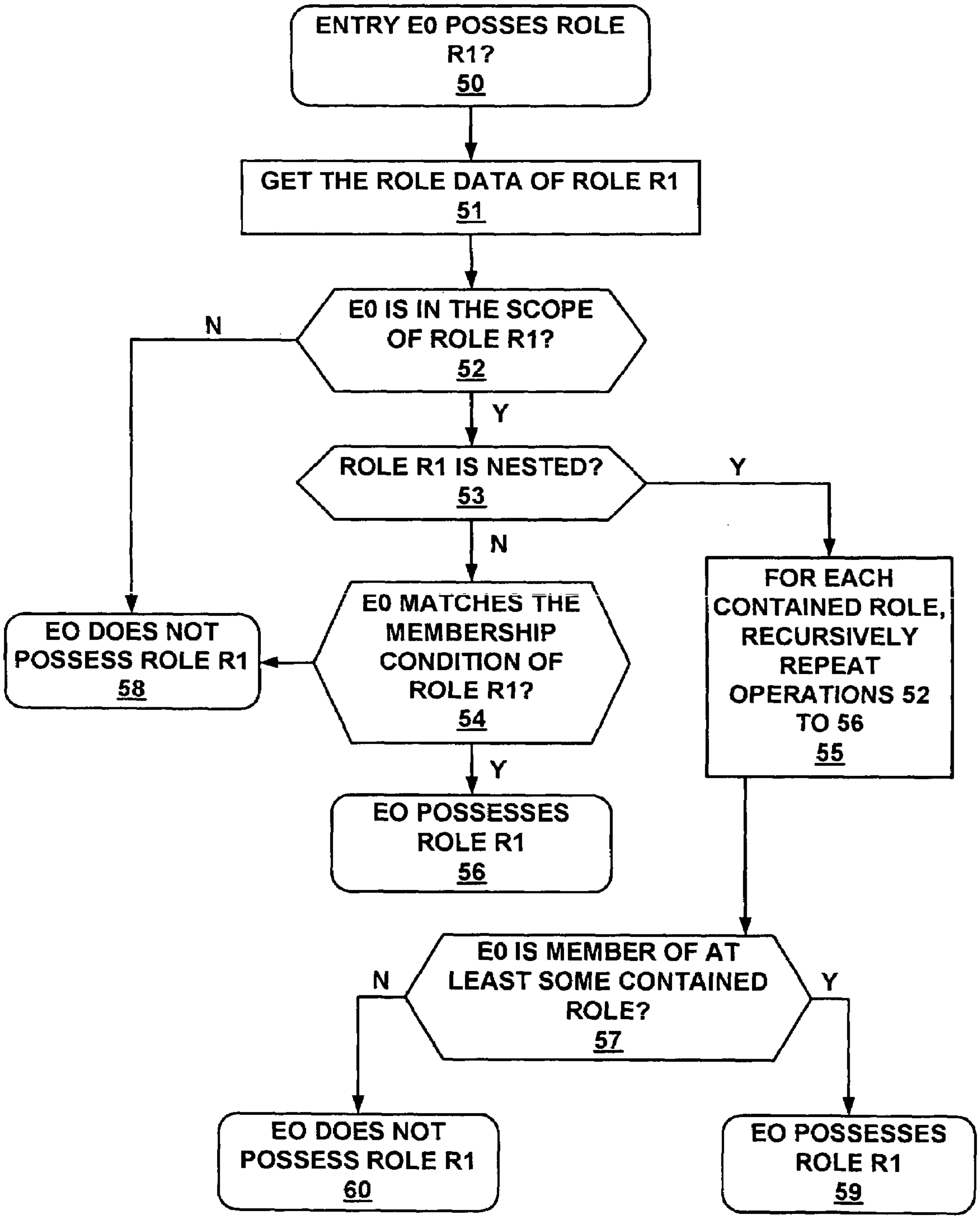
FIG. 9*b* is a flowchart for determining whether a given entry is member of an existing role according to embodiments of the present invention.

Reference is now made to the flowchart of FIG. 9*b*, representing the different operations performed at operation 208 for checking whether a given user entry E0 possesses a given role R1.

At the initial operation 50, the directory server receives the request. Operation 51 retrieves role data associated with role R1. These role data may be represented by a data structure comprising specific information about the role, like the type of the role, e.g., "nested," the filter condition when the role is filtered, and the role distinguished name dn. The role data may be stored in a cache to ease the processing of the request. They are provided from the attributes included in the role definition entry.

Operation 52 checks whether entry E0 is in the scope of role R1. This operation may be performed, comparing part of the distinguished names of entry E0 and role R1.

If entry E0 is in the scope of role R1, operation 53 further checks whether role R1 is nested.

If role R1 is not nested, the server operation 54 checks whether entry E0 matches the membership condition of role R1. If role R1 is filtered, the membership condition corresponds to the filter condition identified by nsRoleFilter attribute; this filter condition is available in the role data. If role R1 is managed, entry E0 should match "nsRoleDN=<role distinguished name>;" the role distinguished name is available in the role data.

If entry E0 matches the membership condition of role R1, at operation 56, the directory server returns that entry E0 possesses role R1.

If role R1 is nested, at operation 55, the directory server recursively performs operations 52 to 56 for each role contained by the nested role. If entry E0 possesses one of the roles contained by role R1 (operation 57), at operation 59, the directory server returns that entry E0 possesses role R1.

If entry E0 is not in the scope of role R1 (operation 52) or if entry E0 does not match the membership condition of role R1 (operation 54), the directory server returns that entry E0 does not possess role R1 (operation 58).

The operations for determining whether a given entry possesses a particular role and for enumerating the roles possessed by a given entry are illustrated by the flowcharts of FIGS. 9*a* and 9*b*. These operations utilize a search based on the role attribute nsrole, which is a virtual attribute. For example, to determine the users belonging to the Manager division, a search like "Idapsearch -b dc=sun, dc=com -s subtree (nsrole=cn=managerRole, o=sun.com) dn" may be used, where "cn=managerRole, o=sun.com" is the role of manager users.

Embodiments of the invention introduce an indexing of virtual attributes so as to enable such searches to be efficiently performed. According to such embodiments, the directory server comprises a resolving function operable for converting a search filter request based on a virtual attribute (or "virtual" search filter) into a search filter request based on real attributes (or "real" search filter).

The conversion of a virtual search filter into a real search filter is made possible because a virtual attribute is computed for an entry depending on a condition (or virtual attribute condition) which is derived from real attributes stored elsewhere in the directory server. For example, a CoS attribute is generated from the real attributes stored in a CoS definition entry and in a CoS template entry and the role attribute nsrole from the real attributes stored in role entries.

The resolving function is part of a filter execution function that is provided by the directory server for evaluating a filter expression. The filter expression may be comprised in a search request from a client.

Figure 10A:
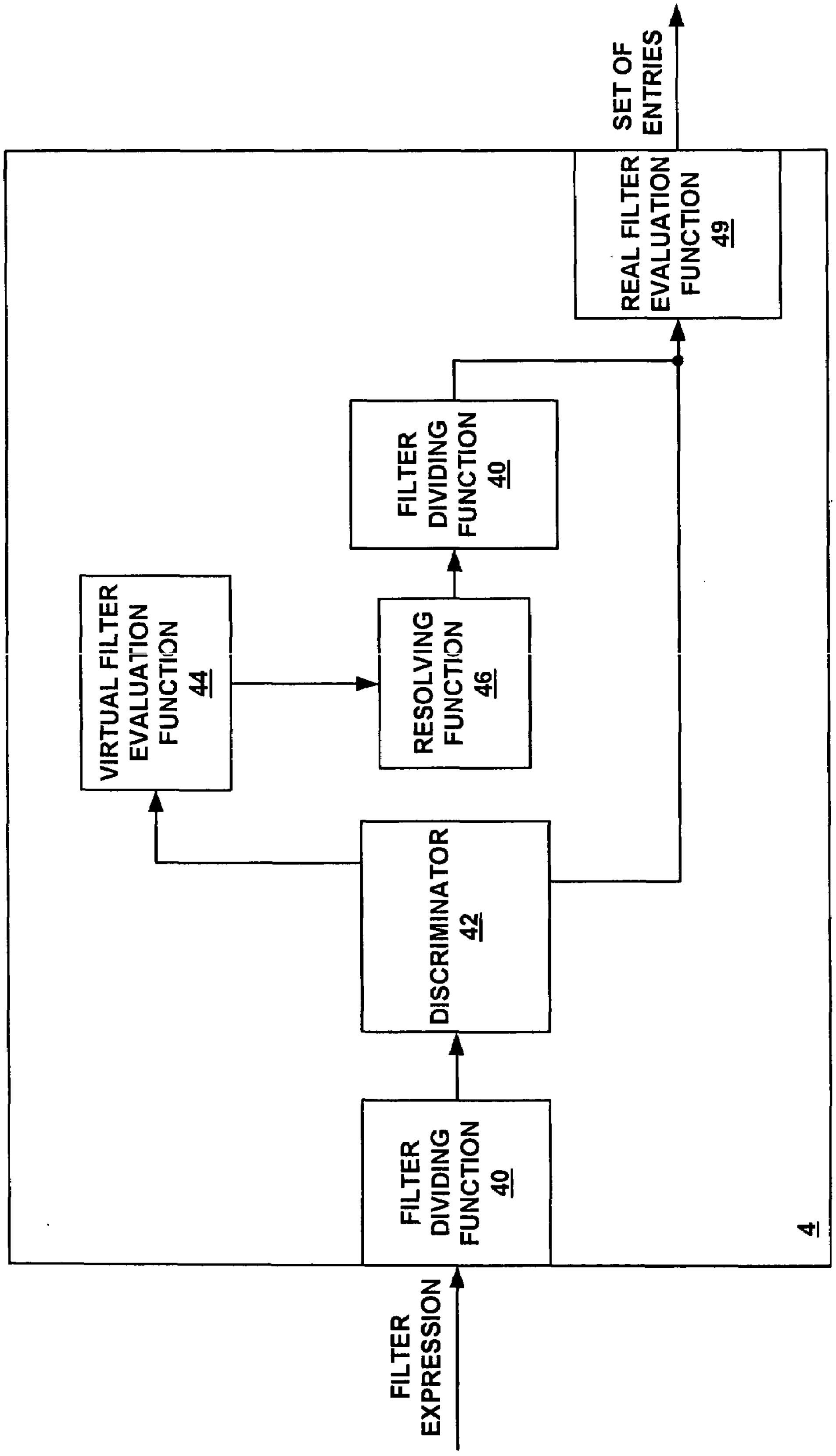
FIG. 10*a* represents the general structure of a filter execution function according to embodiments of the present invention.

The general structure of the filter execution function according to one embodiment of the present invention is represented in FIG. 10*a*. The filter execution function 4 transmits a received filter expression to a filter manager having a filter-dividing function 40 which is operable for breaking down the filter expression into elementary first filter expressions of the type "attribute operator value."

Each elementary first filter expression is then transmitted to a discriminator 42 capable of determining whether the elementary first filter expression is a real-based one or a virtual-based one.

If the elementary first filter expression is real-based, the discriminator 42 transmits it to a real filter evaluation function 49 which evaluates the elementary first filter expression and provides a corresponding set of entries. The real filter evaluation function 49 may determine the corresponding sets of entries from the indexes.

If the elementary first filter expression is virtual-based, the discriminator 42 transmits it to a virtual filter evaluation function 44 which submits the elementary filter expression to the resolving function 46.

The resolving function 46 converts the first filter expression into a second filter expression based on real attributes, and this second filter expression is sent to the dividing function 40 to be broken down into elementary second filter expressions. Then, each elementary second filter expression is transmitted to the real filter evaluation function 49 for evaluation. The real filter evaluation function 49 provides a set of entries for each one of these elementary second filter expression, the filter execution function 4 being arranged to combine the resulting sets of entries in accordance with the second filter expression provided by the resolving function 46.

The filter execution function 4 then combines the sets of entries obtained for each elementary first filter expressions in accordance with the initial filter expression received by the filter execution function 4.

The embodiments of the present invention are illustrated through an example using the nsrole attribute, starting with a discussion about the real attributes from which nsrole is computed.

A user entry would match the filter "nsrole=<roledn>" provided that it possesses the role identified by <roledn>. This implies that the user entry should be in the scope of the role <roledn> and match the membership condition of the role <roledn>.

In the filter expression "nsrole=<roledn>", where <roledn> represents a value of nsrole, the following considerations apply, according to the existing role membership conditions:

i) if <roledn> identifies a managed role, the first filter expression "nsrole=<roledn>" corresponds to the second filter expression "nsroledn=<roledn>," where nsRoleDN is a real attribute;

ii) if <roledn> identifies a filtered role, the first filter expression "nsrole=<roledn>" corresponds the second filter expression "<roledn.nsRoleFilter>," where <roledn.nsRoleFilter> is the value of nsroleFilter attribute of the role identified by <roledn>; the value of nsroleFilter attribute is a role filter condition of the type "attribute operator value", where "attribute" is real;

iii) if <roledn> identifies a nested role containing the roles <roledn.nestedRole__1> to <roledn.nestedRole_N>, the first filter expression "nsrole=<roledn>" is equivalent to the union of the filter expressions "nsrole=<roledn.nestedRole_k>" (with k from 1 and N). Each filter expression "nsrole=<roledn.nestedRole_k>" corresponds to a second filter expression according to operation i) or ii), the nested role identified by <roledn> being associated with the union of the second filter expressions found for the contained roles.

For example, in reference to the roles defined in Exhibit E2:

i1) "nsrole=cn=Marketing, ou=people, dc=example, dc=com" (Exhibit E2.1) corresponds to "nsRoleDN=cn=Marketing, ou=people, dc=example, dc=com;"

ii1) "nsrole=cn=SalesFilter, bu=people, dc=example, dc=com" (Exhibit E2.3) corresponds to "o=sales;"

iii1) "nsrole=cn=MarketingSales, ou=people, dc=example, dc=com" (Exhibit E2.5) this nested role contains:

the role "nsrole=cn=Marketing, ou=people, dc=example, dc=com" corresponding to "nsRoleDN=cn=Marketing, ou=people, dc=example, dc=com;" and the role "nsrole=cn=SalesFilter, ou=people, dc=example, dc=com" corresponding to "o=sales."

Therefore the nested role corresponds to the following real filter expression:

(|(nsRoleDN=cn=Marketing, ou=people, dc=example, dc=com) (o=sales)).

Figure 10B:
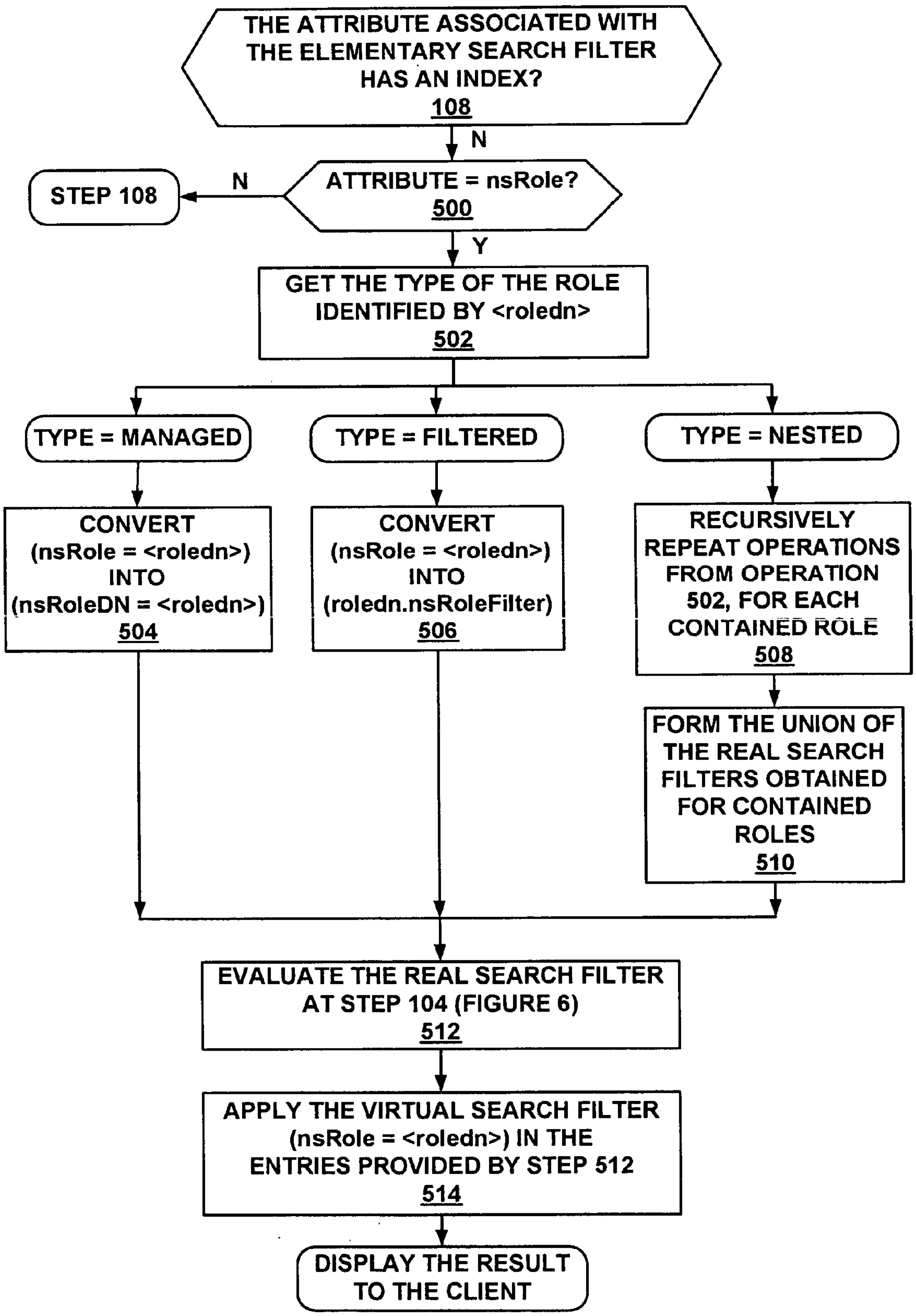
FIG. 10*b* is a flowchart for indexing the virtual attribute nsrole, according to an embodiment of the present invention.

FIG. 10*b* is a flowchart representing, in one embodiment, the operations performed by the directory server for indexing nsrole attribute, in response to a search request comprising an equality search filter of the type: "nsrole=<roledn>."

On receiving a search request, the directory server previously performs operations 102 to 105 of FIG. 6. Operation 105 determines if the attribute associated with the elementary search filter is indexed. However, if the attribute is not indexed, the directory server further determines whether the elementary search filter is based on a virtual attribute nsrole (operation 500).

If the elementary search filter is based on this virtual attribute, e.g., "nsrole=<roledn>," operation 502 determines the type of the role identified by <roledn>. This may be done by accessing the suffix of the role and getting the role data of the role cache associated with that suffix:

if the role is "managed," operation 504 converts the virtual search filter expression "nsrole=<roledn>" into the corresponding real search filter "nsroledn=<roledn>;"

if the role is "filtered," operation 506 converts the virtual search filter expression "nsrole=<roledn>" into the corresponding real search filter expression "<roledn.nsroleFilter>," where <roledn.nsroleFilter> is the value of nsRoleFilter attribute of the role identified by <roledn>;

if the role is "nested," the directory server recursively performs operations 502 to 506 for each contained role (operation 508), and the "real" search filter expression corresponding to the "virtual" search filter expression "nsrole=<roledn>" is attached the union of the "real" search filters expressions found for the contained roles (operation 510).

Operation 512 then evaluates the real search filter provided by any of operations 504, 506 or 510 according to operations 104 to 115 of FIG. 6. Equality indexes may have been previously created for the real attributes nsRoleDN and for the filters defined by the filtered roles (e.g., o=sales).

Operation 512 provides a list of candidates entries representing the entries matching the real search filter.

Figure 11:
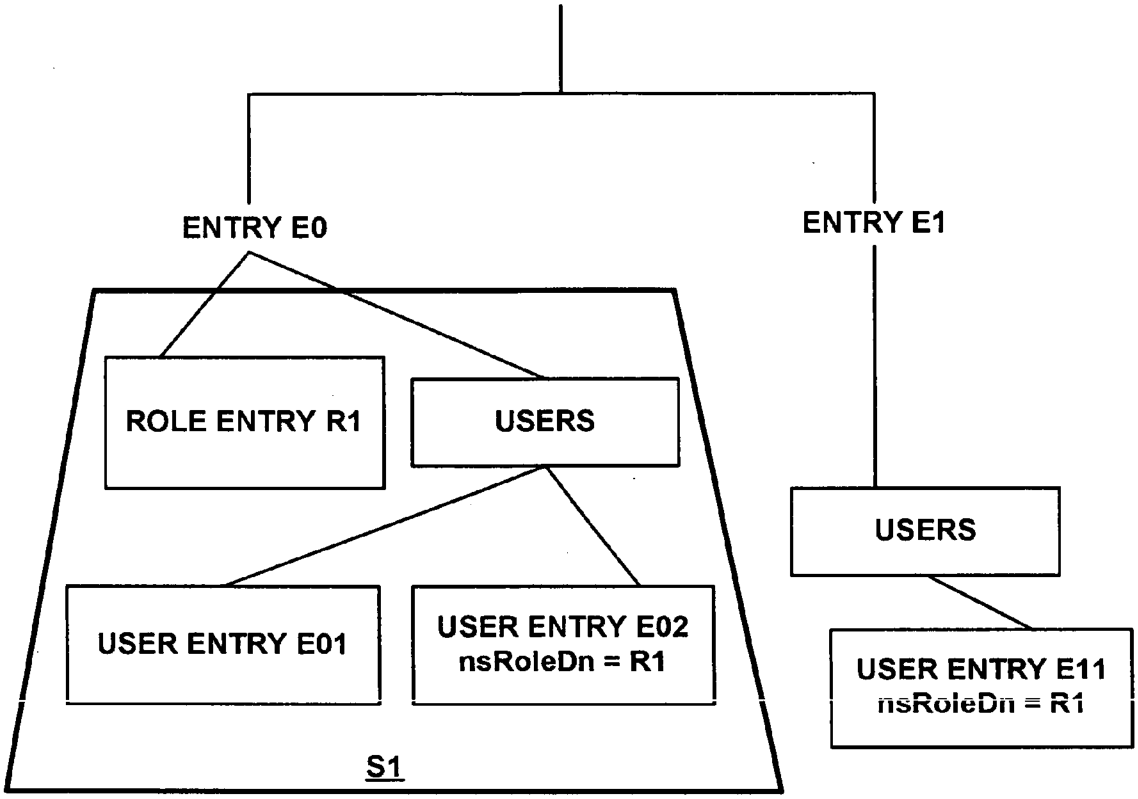
FIG. 11 represents a portion of a directory tree illustrating a scope restriction according to an embodiment of the present invention.

However, the list of candidate entries provided by operation 512 may contain more entries than required. The conversion of the virtual search filter "nsrole=<roledn>" into a "real" search filter does not take the scope restriction into account. Indeed, some of the entries matching the "real" search filter associated with the "virtual" search filter may not be in the scope of the role identified by <roledn>. For example, in FIG. 11, the user entry E02 and the user entry E11 comprise "nsRoleDN=R1," R1 being a managed role. Operation 512 would return entry E02 and entry E11, in response to a search request based on the filter (nsrole=R1). But entry E02 is in the scope S1 of role R1 while entry E11 is not in the scope S1 of role R1, and therefore entry E02 possesses R1 (E02 matches "nsrole=R1") and entry E11 does not actually possess role R1.

Operation 514 is performed to restrict the set of entries provided by operation 512 to those which match the role scope condition. Operation 514 evaluates the initial virtual search filter restricted for the list of the candidate entries provided by operation 512. The virtual search filter can now be applied efficiently as the number of candidate entries is not important. For example, to evaluate this virtual search filter, the directory server may compute nsrole attribute for each entry of the list of candidate entries to check if the entry is actually member of the role.

Additionally, operation 500 previously determines if the filter comprises a negation, e.g., (!(nsrole=<roledn>). Such negative search filters are not currently indexed. It is due to the fact that search filters that comprise a negation of the type (!(attr=<attr_value>)) not only returns the entries where attr has a value different from <attr_value>, but also entries where the attr attribute is not defined. As well, the invention does not support negative filters. If a filter of the type (!(nsrole=<roledn>) is detected, the search filter is resolved according to operation 501.

The embodiments of this invention have been described in reference to an equality search filter of the type (nsrole=<roledn>). Alternatively, the invention may process other type of search filters. For example, the request may comprise the presence search filter "nsrole=*," which means that the entries containing one or more values of nsrole are searched. The presence index may be maintained from the equality index. The directory server may directly determines the list of candidate entries, at operation 504, 506 or 508 of FIG. 10*b* by performing the union of the entries stored in the equality indexes.

It will be appreciated that many of the features being described in terms of operations may also be encompassed in terms of functions in a directory server and/or directory server system, and conversely.

This invention also encompasses software code, especially when made available on any appropriate computer-readable medium. The expression "computer-readable medium" includes a storage medium such as magnetic or optic, as well as a transmission medium such as a digital or analog signal. Such software code may include data and/or metadata.

This invention also encompasses the software code to be added to existing directory server functionalities to perform anyone of the various new functionalities, as described above, which may be used independently of each other.

On another hand, a number of features have been positively described, using absolute language, to help understanding the LDAP example. Each such feature should be considered as exemplary only, and is not intended to restrict the scope of this invention in any way.

Embodiments of the present invention have been described. The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A system for filtering a plurality of entries organized in a tree structure of a directory server, the system comprising:

a resolving function configured to:

receive a first filter expression, wherein the first filter expression is based on a virtual attribute, wherein a value of the virtual attribute is computed from a value of a first real attribute, and wherein the first real attribute is an attribute that supports indexing, and convert the first filter expression into a second filter expression, wherein the second filter expression is based on the first real attribute; and a real filter evaluation function configured to:

receive the second filter expression, and obtain an entry selected from the plurality of entries organized in the tree structure of the directory server, wherein the entry matches the second filter expression.

2. The system of claim 1, further comprising:

an indexing table comprising;

an ordered list of attribute values, wherein an attribute value selected from the ordered list of attribute values comprises the value of the first real attribute, and a plurality of entry identifiers associated with the ordered list of attribute values, wherein obtaining the entry comprises obtaining the entry identifier.

3. The system of claim 1, further comprising:

a discriminator configured to:

obtain the first filter expression, transmit the first filter expression to the resolving function, based on the fact that the first filter expression is based on the virtual attribute, obtain a third filter expression, wherein the third filter expression is based on a second real attribute, and transmit the third filter expression to the real filter evaluation function, based on the fact that the third filter expression is based on the second real attribute.

4. The system of claim 1, further comprising:

a filter execution function configured to determine whether the entry matches the first filter expression, to obtain a result in accordance with the first filter expression.

5. The system of claim 4, further comprising:

a filter manager configured to:

obtain a request comprising the first filter expression, call the filter execution function, using the first filter expression, and transmit the result in response to the request.

6. The system of claim 1, further comprising:

a filter-dividing function configured to divide the first filter expression into a plurality of elementary first filter expressions, wherein an elementary first filter expression selected from the plurality of elementary first filter expressions is based on the virtual attribute.

7. The system of claim 6, further comprising:

a filter execution function configured to combine entries satisfying attribute conditions defined by the plurality of elementary first filter expressions, in accordance with the first filter expression.

8. The system of claim 6, wherein the filter-dividing function is further configured to divide the second filter expression into a plurality of elementary second filter expressions, wherein an elementary second filter expression selected from the plurality of elementary second filter expressions is based on the first real attribute.

9. The system of claim 1, wherein the first filter expression comprises an operator defining a relationship between a virtual attribute name and a virtual attribute value.

10. The system of claim 1, wherein the plurality of entries comprises a role entry and a user entry, wherein the first filter expression comprises a role membership condition for the user entry, and wherein the role membership condition is associated with the role entry.

11. The system of claim 10, wherein the first real attribute comprises a role identifier associated with the role entry, and wherein the user entry satisfies the role membership condition if the user entry comprises an attribute designating the role identifier.

12. The system of claim 10, wherein the role entry comprises a plurality of roles, and wherein the user entry satisfies the role membership condition if the user entry is a member of at least one of the plurality of roles.

13. The system of claim 10, wherein the first real attribute comprises a role filter condition, and wherein the user entry satisfies the role membership condition if the user entry satisfies the role filter condition.

14. The system of claim 10, wherein the role entry is associated with a scope of the tree structure, and wherein the role membership condition comprises a scope condition.

15. A method for filtering a plurality of entries organized in a tree structure of a directory server, the method comprising:

receiving a first filter expression, wherein the first filter expression is based on a virtual attribute, wherein a value of the virtual attribute is computed from a value of a real attribute, and wherein the real attribute is an attribute that supports indexing;

converting the first filter expression into a second filter expression, wherein the second filter expression is based on the real attribute; and obtaining an entry selected from the plurality of entries organized in the tree structure of the directory server, wherein the entry matches the second filter expression.

16. The method of claim 15, wherein obtaining the entry comprises obtaining an entry identifier selected from a plurality of entry identifiers stored in an indexing table, wherein the plurality of entry identifiers is associated with an ordered list of attribute values stored in the indexing table, and wherein an attribute value associated with the entry identifier comprises the value of the first real attribute.

17. The method of claim 15, further comprising:

determining whether the entry matches the first filter expression, to obtain a result in accordance with the first filter expression.

18. The method of claim 15, wherein converting the first filter expression to the second filter expression is performed based on the fact that the first filter expression is based on the virtual attribute.

19. The method of claim 15, further comprising:

dividing the first filter expression into a plurality of elementary first filter expressions, wherein an elementary first filter expression selected from the plurality of elementary first filter expressions is based on the virtual attribute; and combining entries satisfying attribute conditions defined by the plurality of elementary first filter expressions, in accordance with the first filter expression.

20. The method of claim 15, further comprising:

dividing the second filter expression into a plurality of elementary second filter expressions, wherein an elementary second element filter selected from the plurality of elementary second filters is based on the real attribute; and combining entries satisfying attribute conditions defined by the plurality of elementary second filter expressions, in accordance with the second filter expression.

21. The method of claim 15, wherein the plurality of entries comprises a role entry and a user entry, wherein the first filter expression comprises a role membership condition for the user entry, and wherein the role membership condition is associated with the role entry.

22. The method of claim 15, further comprising:

determining whether the entry satisfies the virtual attribute condition to obtain a result in accordance with the first filter expression.

23. A computer-usable medium comprising program code embodied therein for filtering a plurality of entries organized in a tree structure of a directory server by:

receiving a first filter expression, wherein the first filter expression is based on a virtual attribute, wherein a value of the virtual attribute is computed from a value of a real attribute, and wherein the real attribute is an attribute that supports indexing;

converting the first filter expression into a second filter expression, wherein the second filter expression is based on the real attribute; and obtaining an entry selected from the plurality of entries organized in the tree structure of the directory server, wherein the entry matches the second filter expression.

24. The computer-usable medium of claim 23, wherein obtaining the entry comprises obtaining an entry identifier selected from a plurality of entry identifiers stored in an indexing table, wherein the plurality of entry identifiers is associated with an ordered list of attribute values stored in the indexing table, and wherein an attribute value associated with the entry identifier comprises the value of the first real attribute.

25. The computer-usable medium of claim 23, further comprising program code embodied therein for filtering the plurality of entries by:

determining whether the entry matches the first filter expression to obtain a result in accordance with the first filter expression.

26. The computer-usable medium of claim 23, wherein converting the first filter expression to the second filter expression is performed based on the fact that the first filter expression is based on the virtual attribute.

27. The computer-usable medium of claim 23, further comprising program code embodied therein for filtering the plurality of entries by:

dividing the first filter expression into a plurality of elementary first filter expressions, wherein an elementary first filter expression selected from the plurality of elementary first filter expressions is based on the virtual attribute; and combining entries satisfying attribute conditions defined by the plurality of elementary first filter expressions, in accordance with the first filter expression.

28. The computer-usable medium of claim 23, further comprising program code embodied therein for filtering the plurality of entries by:

dividing the second filter expression into a plurality of elementary second filter expressions, wherein an elementary second element filter selected from the plurality of elementary second filters is based on the real attribute; and combining entries satisfying attribute conditions defined by the plurality of elementary second filter expressions, in accordance with the second filter expression.

29. The computer-usable medium of claim 23, wherein the plurality of entries comprises a role entry and a user entry, wherein the first filter expression comprises a role membership condition for the user entry, and wherein the role membership condition is associated with the role entry.

30. The computer-usable medium of claim 23, further comprising program code embodied therein for filtering the plurality of entries by:

determining whether the entry satisfies the virtual attribute condition to obtain a result in accordance with the first filter expression.

* * * * *